No. 784,694.  
Patented March 14, 1905.

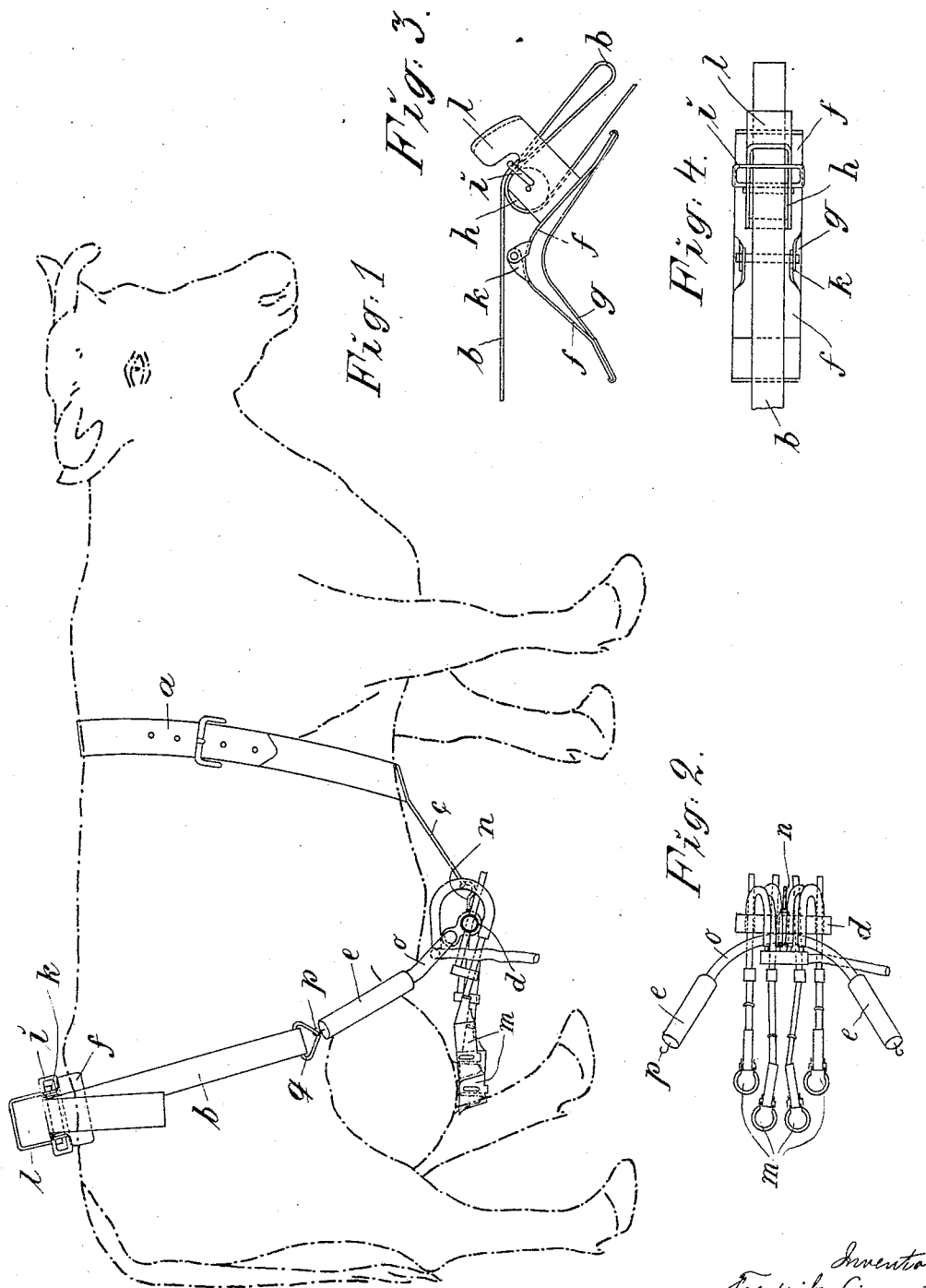

UNITED STATES PATENT OFFICE.

FREDRIK LJUNGSTRÖM, OF STOCKHOLM, SWEDEN.

SUPPORTING-HARNESS FOR MILKING-MACHINES.

SPECIFICATION forming part of Letters Patent No. 784,694, dated March 14, 1905.

Application filed March 16, 1904. Serial No. 198,444.

*To all whom it may concern:*

Be it known that I, FREDRIK LJUNGSTRÖM, a subject of the King of Sweden and Norway, residing at Stockholm, in the Kingdom of Sweden, have invented certain new and useful Improvements in Supporting-Harness for Milking-Machines; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates to harness for supporting milking-machines, and has for its object to hold the machine stationary relatively to the udder to prevent undue strain on the teats, as well as to enable the adjustment of the machine to various sizes of udders, as will be hereinafter more fully described and claimed.

Referring to the accompanying drawings, in which like parts are similarly designated, Figure 1 is a side elevation showing a milking-machine attached to a cow. Fig. 2 is a plan view of the machine. Fig. 3 is an elevation of the adjustable saddle that forms a part of the harness, and Fig. 4 is a plan view of the same.

The harness comprises a girth $a$, having a short strap $c$ secured thereto, and an adjustable saddle to be placed on the rump or just behind the hips to support a strap $b$, adjustable in the saddle. The saddle comprises a main support consisting of a piece of leather $g$ or other flexible material that engages the ends of plates $f$, hinged together at $k$, so that ordinarily when fitting over the rump of a cow the hinge will be somewhat above the main support $g$, the structure being thereby self-adjusting to various sizes of animals. On one of the plates $f$ is a frame $l$, in which is journaled a roller $h$ and in which is pivoted a yoke $i$, eccentric to the roller. A bight of the strap $b$ passes over the roller $h$ and under the yoke $i$, said yoke acting to bind the strap against the roller by reason of the weight on the straps.

The milking devices $m$ are secured to their support $d$, that is provided with a hook $n$ and arms $o$, having cylindrical or other suitably-formed ends $e$. The ends $e$ are each provided with a hook $p$, that takes directly into the ends of the strap $b$ or, as shown, hook into eyes $q$, secured to the end of the strap $b$.

The girth $a$ is buckled on the cow so that the short strap $c$ is underneath and the saddle is placed on the rump, with an end of strap $b$ depending on each side of the cow. The hooks $p$ are hooked in the eyes $q$ and the hook $n$ in the short strap $c$. The bight of the strap $b$ is then taken up or let out, as required, to raise or lower the milking-machine into proper position, and then a milking device is applied to each teat of the cow.

I have not herein described in detail the milking devices $m$ and their support $d$, as these form the subject-matter of separate applications for patent.

Having thus described my invention, what I claim as new therein, and desire to secure by Letters Patent, is—

1. The combination with a milking-machine having lateral supporting-arms and a hook, of a girth adapted to be connected to the hook, a self-adjusting rump-saddle, a strap adjustably held in the saddle, the ends of which strap are connected to the arms of the milking-machine, substantially as and for the purposes set forth.

2. The combination with a milking-machine having lateral supporting-arms of a central hook, of a girth, a short strap connected at one end to the girth and the other end attached to said hook, a saddle, hinged plates thereon, a roller mounted on one of said plates, a yoke pivoted eccentrically to the roller, a strap passing between the roller and yoke, the ends thereof being attached to the arms of the milking-machine, substantially as and for the purposes set forth.

In testimony that I claim the foregoing as my invention I have signed my name in presence of two subscribing witnesses.

FREDRIK LJUNGSTRÖM.

Witnesses:
TH. WAWRINSKY,
L. KALLENBERG.